(12) United States Patent
Cooper

(10) Patent No.: US 11,284,749 B2
(45) Date of Patent: Mar. 29, 2022

(54) WRITING AND READING TABLE FOR A BATHTUB

(76) Inventor: Kim Cooper, Westminster, CA (US)

( * ) Notice: Subject to any disclaimer, the term of this patent is extended or adjusted under 35 U.S.C. 154(b) by 0 days.

(21) Appl. No.: 11/640,588

(22) Filed: Dec. 18, 2006

(65) Prior Publication Data

US 2007/0170339 A1    Jul. 26, 2007

Related U.S. Application Data

(63) Continuation-in-part of application No. 10/770,835, filed on Jan. 28, 2004, now Pat. No. 7,278,622.

(51) Int. Cl.
*A47K 3/00*    (2006.01)
*F16M 11/00*   (2006.01)

(52) U.S. Cl.
CPC .............. *A47K 3/004* (2013.01); *A47K 3/001* (2013.01); *F16M 11/00* (2013.01)

(58) Field of Classification Search
USPC ................ 248/447, 458, 460, 130, 136, 150
See application file for complete search history.

(56) References Cited

U.S. PATENT DOCUMENTS

| | | | |
|---|---|---|---|
| 3,606,235 A | 9/1971 | Young | |
| 3,698,328 A * | 10/1972 | Weir | A47B 23/025 108/6 |
| 3,995,796 A * | 12/1976 | Kline | 248/121 |
| 4,199,125 A | 4/1980 | Simon | |
| 5,199,680 A * | 4/1993 | Rivera | 248/441.1 |
| 5,615,856 A | 4/1997 | Simington | |
| 5,669,313 A | 9/1997 | Cottingham | |
| 5,671,900 A * | 9/1997 | Cutler | 248/451 |
| 5,707,036 A | 1/1998 | Dunbar | |
| 5,761,753 A | 6/1998 | Talbert | |
| 5,908,207 A | 6/1999 | Wilson | |
| 5,971,344 A * | 10/1999 | Ainsworth | A47B 23/046 248/445 |
| 5,979,857 A | 11/1999 | Holm | |
| 6,032,586 A * | 3/2000 | Reyes | 108/43 |
| 6,598,839 B2 | 7/2003 | Loughman | |
| 6,672,556 B1 * | 1/2004 | Hsia | 248/447 |
| 6,736,358 B2 * | 5/2004 | Johnson | 248/125.3 |
| 7,040,591 B1 * | 5/2006 | Simon | 248/458 |
| 7,278,622 B2 * | 10/2007 | Cooper | 248/457 |

FOREIGN PATENT DOCUMENTS

CA        1099670 A  *  4/1981

* cited by examiner

*Primary Examiner* — Alfred J Wujciak
(74) *Attorney, Agent, or Firm* — Christopher Mayle; Bold IP, PLLC

(57) ABSTRACT

A system and method for a device for supporting writing and reading materials such as books that are held with a spring loaded clip so the user may view the materials in the inverted position while they are in the bath tub or relaxing in bed whereby the user may orientate the device for a more comfortable view as well as fold up the device to place it in storage.

5 Claims, 5 Drawing Sheets

WRITING AND READING TABLE FOR A BATHTUB

CROSS REFERENCE TO RELATED APPLICATIONS

This application is a continuation-in-part which claims benefit to U.S. non-provisional utility application Ser. No. 10/770,835, filed on Jan. 28, 2004, entitled Writing and Reading Table for a Bathtub, which is incorporated by reference herein in its entirety.

FIELD OF THE INVENTION

The present invention is directed toward display stands. More specifically, it is directed to devices which enable individuals to conveniently read and write in a variety of places, such as the bathtub, while lying on a couch, or in bed.

BACKGROUND OF THE INVENTION

Long, luxurious baths are a great source of relaxation for millions of people. Reading or writing in the bathtub, while a source of enjoyment, has always been problematic because it is often difficult to keep writing materials and books dry. There are a number of devices which relate to facilitating the ability of individuals to read and/or write in a bathtub. The patent literature discloses a number of prior art systems which show or disclose the use of tables or supports in a bathtub.

U.S. Pat. No. 5,761,753, for example, discloses a device for enabling a person, while bathing, to perform other activities including reading, writing, smoking and drinking. The device comprises of a main support bar having a telescoping support tube slidably and adjustably mounted therein, the main support bar being arranged to be pivotally mounted on a tub and the telescoping support tube being arranged to be releasably mounted on a tub; a clamping-bracket to pivotally mount one end of the main support bar onto a tub; a releasable mounting to releasably mount the telescoping support tube onto a tub; and a book holder supported by a support ledger onto the main support bar/telescoping support tube combination, the book holder having a pen/pencil holder built therein.

U.S. Pat. No. 5,707,036 discloses a bathtub book holding device that includes a bathtub rim clamping member with adjustable grasping legs and a top platform circular post to telescopically receive a T-shaped tubular connector, which also receives telescopically a supporting beam member affixed to a rectangular planar book supporting member; the T-shaped connector replaceable with offset adjustable and non adjustable cross fittings to enhance vertical, horizontal and angular rectangular planar book supporting member ideal placement.

U.S. Pat. No. 5,669,313 discloses a device for erectly supporting an open book on a bathtub. The device has a planar member adapted to slide on the top side portion of the bath tub, which has a length extending generally across the width of the bathtub and a lateral trough extending across a central front portion thereof adapted to erectly support the open book. In the preferred embodiment the device is molded from plastic and has a peripheral top rim, in which handles are formed therein on opposite ends. Two curved ridges are adapted to extend below the top rim of the bathtub and maintain the tub table on the tub when it is slid there along, and extend downwardly from the bottom side portion of the tub table. The curved ridges may have feet on opposite ends to support the Tub Table on a supporting surface when it is not positioned on the bathtub.

U.S. Pat. No. 4,199,125 discloses a reading stand for use in the bathtub which is mounted on a transparent, waterproof container that holds the reading material and has clips that are used to turn the pages without wetting them.

There are several additional devices which disclose book or magazine holders. These include U.S. Pat. Nos. 3,606,235, 5,979,857, 6,598,839, 5,908,207 and 5,615,856. However, there is not a device that includes a magazine rack, a cup holder, towel ring, an adjustable spring for securing reading material and the ability for the book holder to be used as a flat table and that can pivot to various forward positions.

As can be seen from the above, most of the prior devices are complicated and cumbersome. It would be desirable to provide a movable and adjustable system which can be easily placed and adjusted to hold written material in or in association with a bath tub. The book holding device would possess a further favorable feature if it could be used as a flat table and if the system was able to fold easily for space saving and storage. Further, it would be advantageous to provide a system which includes additional amenities such as a magazine rack and a cup holder. It would also be desirable to provide a bathtub table mechanism which can be manufactured from a variety of materials and that can be easily pivoted to easily adjust for person's height. Accordingly, the present invention described herein encompasses these elements.

SUMMARY OF THE INVENTION

It is an object of the present invention to provide a mechanism for supporting writing and reading materials in a bath that comprises a base member that has a weighted bottom to support the mechanism; a vertically extending pole member extending upward from the base; a horizontal bar member affixed at a swivel to the top of the vertically extending pole member; a second horizontal bar member pivotably affixed to the first horizontal bar member; and a support table affixed to the second horizontal bar member.

It is a further object of the present invention is to provide a mechanism for supporting writing and reading materials where the vertically extending pole is constructed with a telescoping design so it can be easily adjusted for height.

It is yet a further object of the present invention to provide a mechanism for supporting writing and reading materials where the support table can be used to hold magazines or books that a user can read while in a bath tub.

It is still yet a further object of the present invention to provide a mechanism for supporting writing and reading materials where the support table can be turned horizontally to be used as a flat table.

It is yet a further object of the present invention to provide a mechanism for supporting writing and reading materials where a magazine/book rack, a cup holder and towel ring are affixed to said mechanism for convenient access and storage.

It is still yet a further object of the present invention to provide a mechanism for supporting writing and reading materials that can be easily folded for space saving and storage purposes.

A BRIEF DESCRIPTION OF THE DRAWINGS

DETAILED DESCRIPTION OF THE INVENTION

Figure 1:
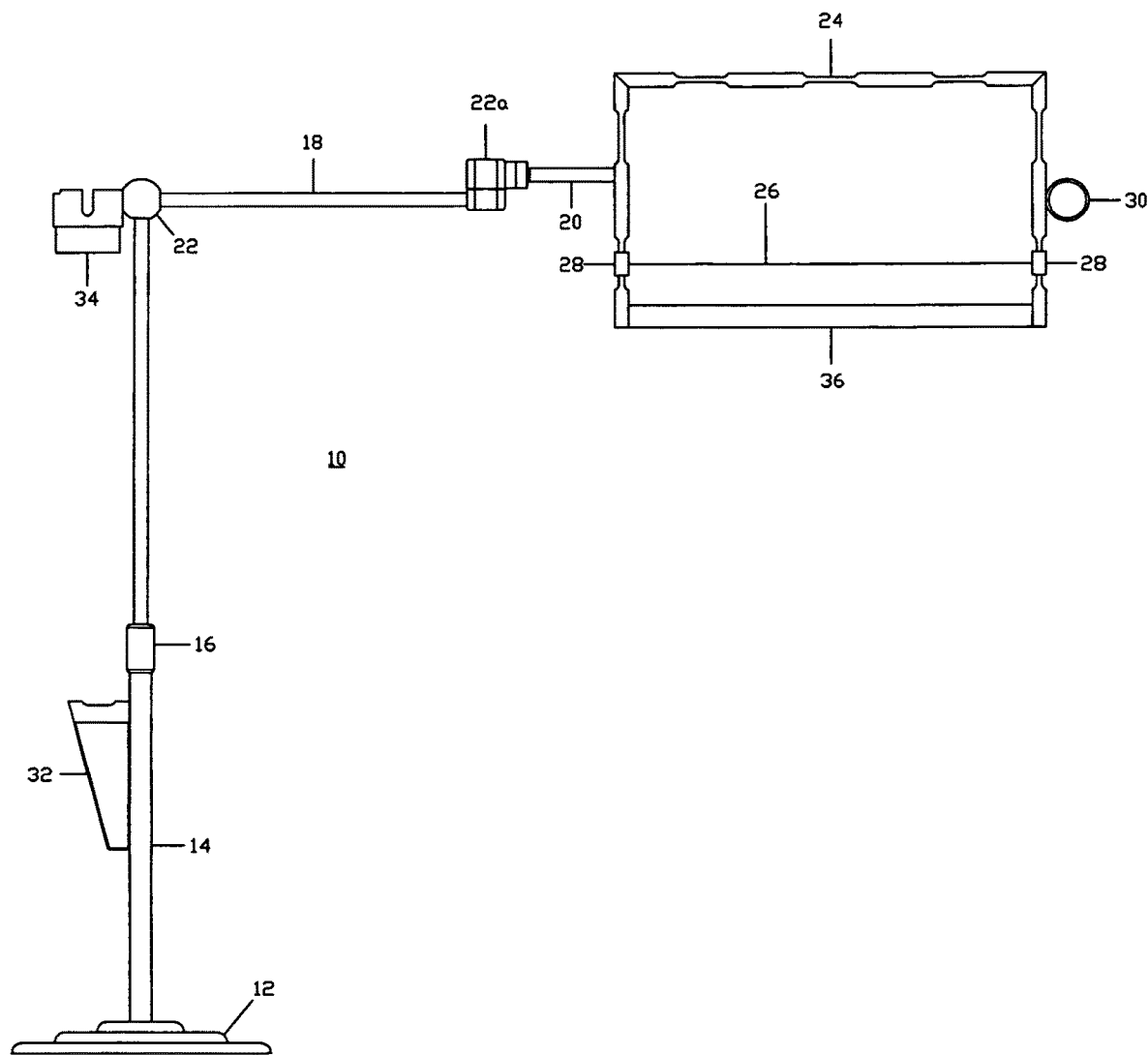
FIG. 1 is a side perspective view of the present invention.

The present invention is described with reference to the enclosed Figures, wherein the same numerals are utilized applicable. As shown in FIG. 1, the present invention is directed to a device 10 for holding and supporting reading and writing materials.

Figure 2:
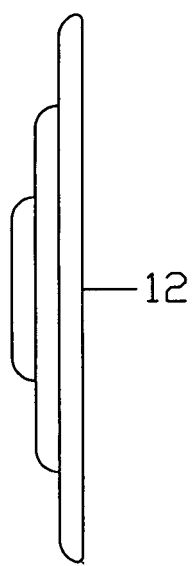
FIG. 2 is an isolated side view of the base of the present invention.
Figure 3:
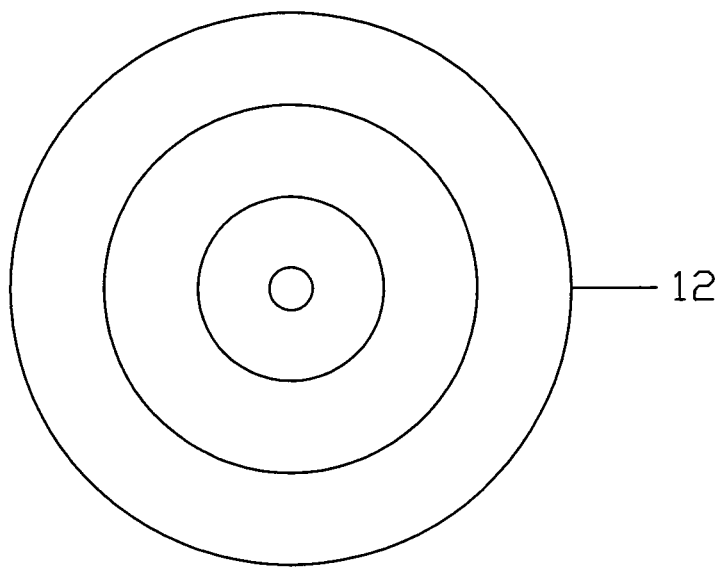
FIG. 3 is a plan view of the bottom of the base of the present invention.

Referring to FIG. 1, the present invention is a mechanism 10 for enabling a bather to read or write in a bathtub. The invention comprises a base member 12. As shown in FIGS. 2 and 3, the base 12 is designed so the weight is distributed to be greater at the bottom of the base than at the top. This configuration increases the stability of the mechanism 10, as it will be less susceptible from being swayed or knocked over. The base 12 may be constructed from a wide variety of other materials including plastics, steel, aluminum, wood and titanium.

As shown in FIG. 1, in a most preferred embodiment, the base 12 member has a substantially vertical pole 14 connected to the base plate and extending upward. The substantially vertical pole telescopes upwardly from adjustment point 16 so as to permit adjustment of the height of the unit.

The top of the vertical telescoping pole 14 is attached to two horizontally bar members 18, 20. Each of the bar members is affixed to a swivel pivot 22, 22a which enable the unit to be adjusted. The first bar member 18 is connected at one end to a pivot 22 affixed to the top of the vertical pole 14. The second bar member 20 is affixed to the secondary swivel pivot 22a.

A support frame 24 is attached to the end second bar member 20. The support frame 24 can come in a variety of shapes. The support frame 24 itself may swivel upward or downward as bar member 20 is turned at pivot 22 a. The frame can be constructed from any number of materials including plastic, aluminum, wood, or other suitable metals. The support frame 24 includes a spring loaded clip 26 which can hold reading materials in place when they are placed on the support frame 24. The clip 26 will allow reading materials to be read and kept dry even when the support frame 24 is places in an inverted position. The clip 26 can be attached to the support frame 24 at various connection points 28 along the side of the support frame 24. There is also a lip 36 at the bottom of the support frame 24 to support heavier reading materials. A towel ring 30 is attached to the support frame so that a user may place their towel in the towel ring 30 while in the bath tub. The vertical pole 14 is also fitted with a cup holder 34 and magazine rack 32, which provide added storage while the mechanism 10 is in use.

Figure 4:
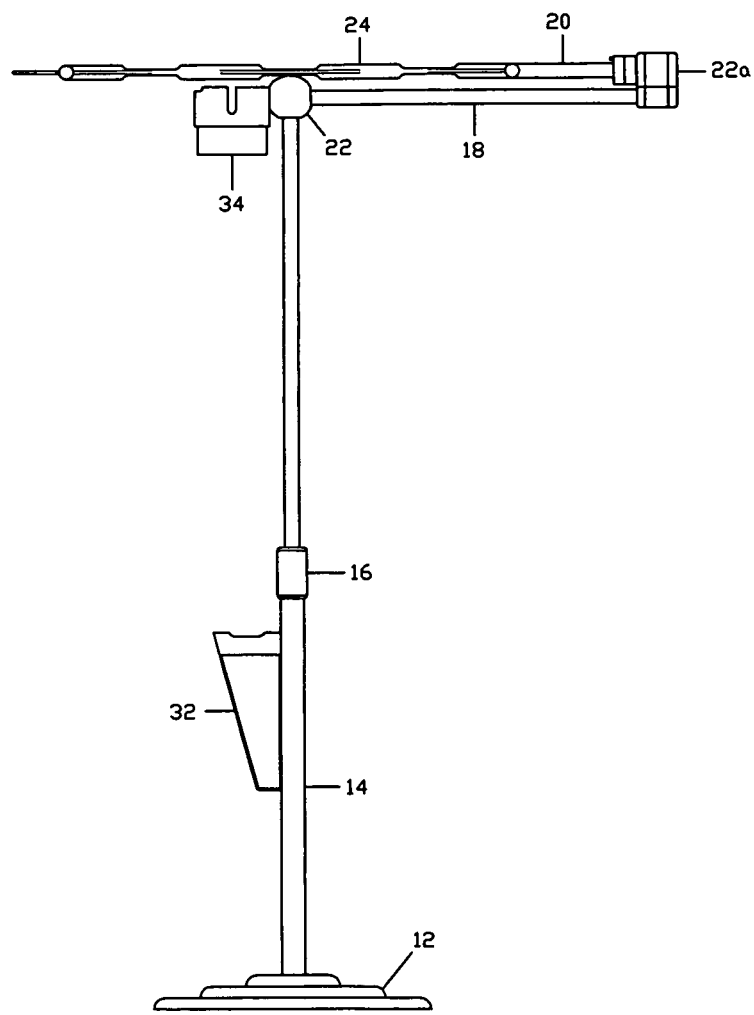
FIG. 4 is a side perspective view of the present invention with the table top in the horizontal folded position.

As shown in FIG. 4, the mechanism 10 can also be configured to be used as a flat table. The support frame 24 can be turned at pivot 22 a so that bar member 20 and support frame 24 are positioned directly over horizontal arm 18. In this configuration, the support frame 24 can be used as an eating table or a flat workspace.

Figure 5:
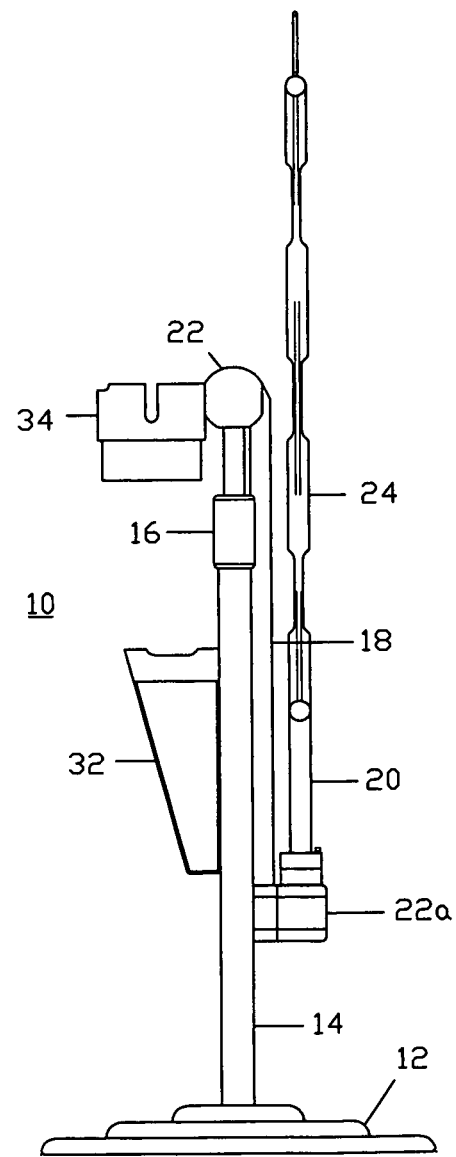
FIG. 5 is a side perspective view of the present invention in the storage position.

Referring now to FIG. 5, the mechanism 10 is shown in the storage position. From the flat table configuration described above, the bar member 18 can be turned downwardly at pivot 22 so that is parallel to the vertical arm 14. In the storage position, the mechanism 10 can be easily moved and stored in between uses.

The present invention may be constructed from a variety of materials including steel, aluminum, plastics, and even wood. The present invention has been described with reference to the enclosed Figures. It is to be noted and appreciated that the true nature and scope of the present invention is to be determined with reference to the claims appended hereto.

I claim:

1. A stand for supporting writing and reading materials comprising:
   a base member to support the stand;
   a pole member extending upward from the base member;
   a first bar member affixed at a first swivel pivot at a top of the pole member;
   a second bar member affixed at a second swivel pivot to the first bar member; and
   the stand comprising at least one of a magazine rack attached to the pole member, a cup holder attached to the pole member; and a support frame affixed to the second bar member, the support frame having one or more spring-loaded clips that extend across the support frame, wherein the one or more spring-loaded clips hold the writing or reading materials in place when placed, wherein the one or more spring-loaded clips are directly attached to longitudinal surfaces of the support frame, wherein the pole member is telescopically extendable, the stand configured to be moved and stored wherein a first bar member is turnable downwardly at a first swivel pivot so that the first bar member is parallel to a pole member.

2. The stand of claim 1, the support frame when the second bar member is turned at the second swivel pivot and the support frame is rotated such that the second bar member and the support frame are positionable directly over and horizontally parallel with the first bar member.

3. The stand of claim 1, the one or more spring-loaded clips attached to the support frame at connection points along a side of the support frame.

4. The stand of claim 1, a lip at a bottom of the support frame configured to assist in holding the materials in place.

5. The stand of claim 1, a towel ring attached to the support frame configured to hold a towel.

* * * * *